United States Patent
Stecher

(10) Patent No.: US 9,504,238 B2
(45) Date of Patent: Nov. 29, 2016

(54) FISHING LURE

(71) Applicant: Scott D. Stecher, Marblehead, OH (US)

(72) Inventor: Scott D. Stecher, Marblehead, OH (US)

(*) Notice: Subject to any disclaimer, the term of this patent is extended or adjusted under 35 U.S.C. 154(b) by 104 days.

(21) Appl. No.: 14/487,406

(22) Filed: Sep. 16, 2014

(65) Prior Publication Data

US 2015/0075058 A1    Mar. 19, 2015

Related U.S. Application Data

(60) Provisional application No. 61/878,249, filed on Sep. 16, 2013.

(51) Int. Cl.
    *A01K 85/00*     (2006.01)
    *A01K 85/14*     (2006.01)
    *A01K 85/01*     (2006.01)

(52) U.S. Cl.
    CPC ............ *A01K 85/14* (2013.01); *A01K 85/01* (2013.01)

(58) Field of Classification Search
None
See application file for complete search history.

(56) References Cited

U.S. PATENT DOCUMENTS

| | | |
|---|---|---|
| 4,739,576 A | 4/1988 | Davis |
| 4,956,934 A | 9/1990 | Dahl |
| 4,999,942 A | 3/1991 | Gills |
| 5,070,639 A * | 12/1991 | Pippert ............... A01K 85/01 43/42.09 |
| 5,133,146 A | 7/1992 | Stecher |
| 5,396,728 A * | 3/1995 | Weber ............... A01K 85/14 43/42.37 |
| 6,108,960 A | 8/2000 | Sylla et al. |
| 6,209,254 B1 | 4/2001 | Sylla et al. |
| 6,374,535 B1 | 4/2002 | Bailey |
| 6,578,313 B1 | 6/2003 | Knol |
| 6,804,910 B1 | 10/2004 | Sharp |
| 6,912,808 B1 | 7/2005 | Mak |
| 7,059,080 B2 | 6/2006 | Bendel |
| 7,107,720 B2 * | 9/2006 | Burggrabe ............ A01K 85/16 43/42.47 |
| 7,337,579 B2 | 3/2008 | Thomas |
| 8,429,847 B2 | 4/2013 | Ford |
| 8,789,308 B2 | 7/2014 | Hughes |
| 2007/0101636 A1 * | 5/2007 | Dolence ............ A01K 85/16 43/42.06 |
| 2011/0047856 A1 | 3/2011 | Gustafsson |
| 2011/0061287 A1 | 3/2011 | Ogawa |
| 2013/0192121 A1 | 8/2013 | Ford |
| 2013/0318858 A1 * | 12/2013 | Cook, Jr. ............ A01K 85/16 43/42.22 |

* cited by examiner

*Primary Examiner* — Joanne Silbermann
(74) *Attorney, Agent, or Firm* — Fay Sharpe LLP

(57) ABSTRACT

This disclosure provides a fishing lure including an elongated body and bill, wherein the lure body includes a concave portion. According to an exemplary embodiment, the bill extends away from a head portion of the body at a downward angle and the concave portion smoothly transitions to a top surface of the bill.

15 Claims, 2 Drawing Sheets

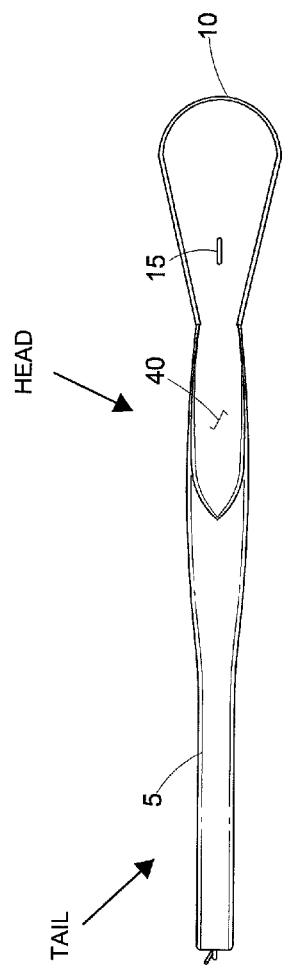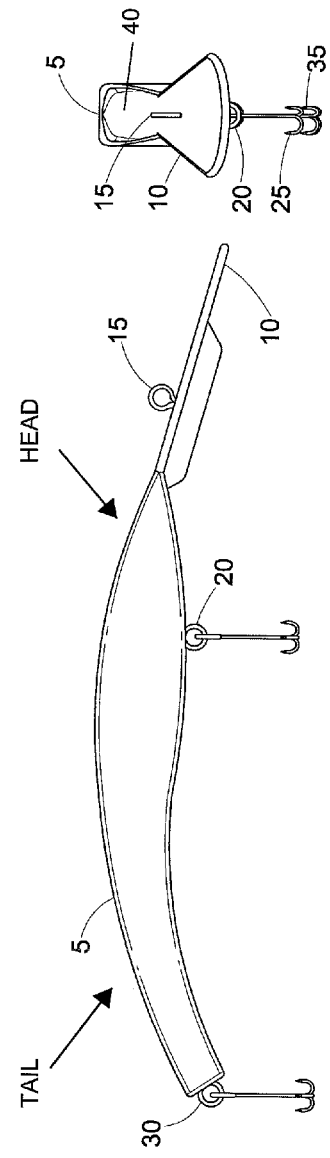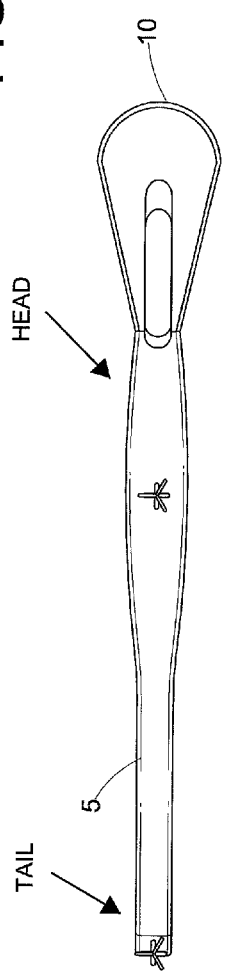

FISHING LURE

This application claims priority to and the benefit of the filing date of U.S. Provisional Patent Application Ser. No. 61/878,249, filed Sep. 16, 2013, by Scott D. Stecher and entitled "FISHING LURE DESIGN" and is incorporated herein by reference in its entirety.

BACKGROUND

The present disclosure and exemplary embodiments therein relate to fishing lures and, in particular, to a diving type lure, also known as a crankbait.

Among the vast numbers of styles, sizes and types of fishing lures, one category of lures are generally denoted as crankbaits. Such lures typically include a body portion and a bill to enable the lure to dive when either trolled or retrieved by a fisherman. Depending on the size and style of the bill and body, as well as the weight of the lure, a crankbait can achieve various depths and behave in various manners to entice a fish to strike the lure.

Provided herein is a lure which incorporates a novel lure body and bill design to provide a unique lure action while being able to dive to various water depths trolling and/or being retrieved by a fisherman.

SUMMARY

In one embodiment of this disclosure, described is a fishing lure comprising an elongated lure body including a head portion, a tail portion, a topside, an underside and a first longitudinal axis defined from an end of the tail portion to an end of the head portion; and a bill extending away from the head portion at a downward angle relative to the first longitudinal axis of the lure body and the bill substantially aligned along a second longitudinal axis offset from the first longitudinal axis at the downward angle, the bill including a top surface, a bottom surface, a front end and a rear end, wherein the lure body includes an open-ended solid concave scoop portion providing a contoured external surface on the topside of the lure body substantially aligned with the bill along the second longitudinal axis associated with the bill alignment.

In another embodiment of this disclosure, described is a fishing lure comprising an elongated lure body including a head portion, a tail portion, a topside, an underside portion including a belly portion, a first lateral side and a second lateral side, wherein a longitudinal axis is defined from an end of the tail portion to an end of the head portion; and a bill extending away from the head portion at a downward angle relative to the first longitudinal axis of the lure body and the bill substantially aligned along a second longitudinal axis offset from the first longitudinal axis at the downward angle, the bill including a top surface, a bottom surface, a front end, and a rear end, wherein the lure body includes an open-ended solid concave scoop portion providing a contoured external surface on the topside of the lure body substantially aligned with the bill along the second longitudinal axis wherein the concave portion smoothly transitions to the bill, and the topside and underside are curved and taper towards an end of the tail portion.

BRIEF DESCRIPTION OF THE DRAWINGS

FIG. 2 is a right side elevational view of an exemplary embodiment of a fishing lure according to this disclosure.

FIG. 3 is a front elevational view of an exemplary embodiment of a fishing lure according to this disclosure.

FIG. 4 is a rear elevational view of an exemplary embodiment of a fishing lure according to this disclosure.

FIG. 5 is a top side plan view of an exemplary embodiment of a fishing lure according to this disclosure.

FIG. 6 is a bottom side plan view of an exemplary embodiment of a fishing lure according to this disclosure.

DETAILED DESCRIPTION

Figure 1:
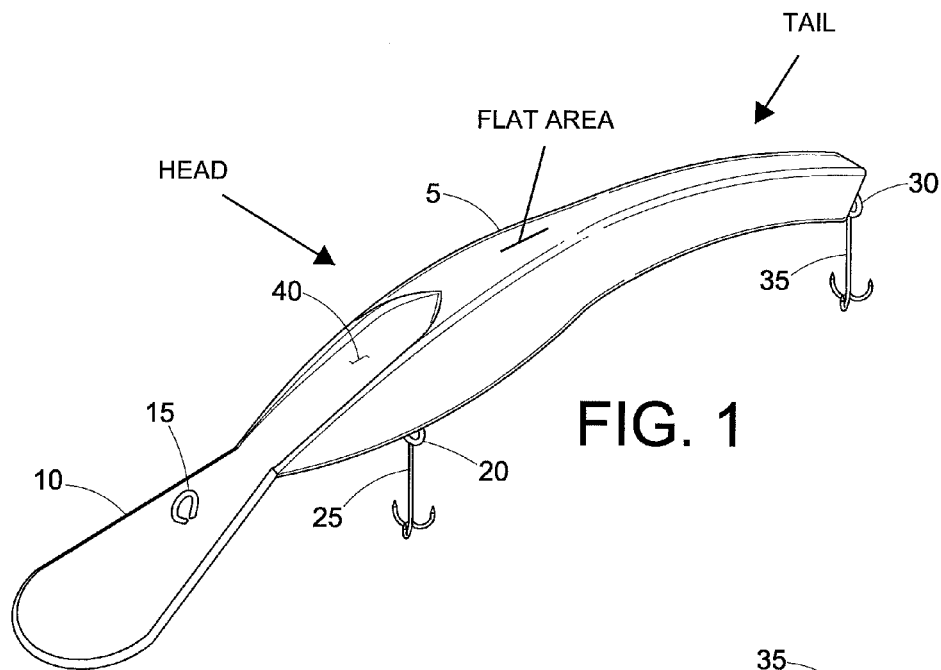
FIG. 1 is a top left side perspective view of an exemplary embodiment of a fishing lure according to this disclosure.

Disclosed herein is a fishing lure including a body with a concave scoop portion integrated with a bill to provide desirable lure diving depths as well as a unique action to entice fish to strike the lure. According to one exemplary embodiment, the fishing lure is manufactured from molded plastic halves which are glued together.

The concave scoop portion on the body of the lure increases the relative diving depth, allowing it to work better in conjunction with the bill. In addition to increasing the diving depth, the scoop also imparts more action to the bait. This bait behaves differently, even at slow speeds, compared to traditional lures. The reason being that the concave surface "rolls" water side to side away from the body creating a swimming action even at slow speeds. At higher speeds this same surface acts like a stabilizer helping the bait to achieve a straight line wobble. Other functions of this unique lure design are the tapering side body widths to promote wobble as the lure deflects water away from the tail section, thereby allowing the tail section to swim more freely. Flat sides also help increase vibration which is attractive to fish.

The lure body disclosed herein can also be used as a "wake-bait" which is a surface lure with a short bill pointing down. Other uses can be a lipless (no bill) version, a shallow diving model and a jigging style with a line through or attached to the center of the body.

With reference to FIGS. 1-7, illustrated is a fishing lure according to one exemplary embodiment of this disclosure.

The fishing lure includes a body 5, a bill 10 including a structural portion 45, a front eyelet 15, a front hook eyelet 20, a hook 25, a back hook eyelet 30, and a back hook 35. The body 5 includes a concave scoop portion 40, as previously described, which is operatively associated with the bill 10 to provide, in part, the diving characteristics of the lure. In addition, the concave scoop portion 40 and bill 10 contribute, in part, to the action of the lure.

As also illustrated in the figures, the lure body includes relatively flat sides and a tapering body width as previously described.

Referring to FIG. 1, illustrated is a top left side perspective view of an exemplary embodiment of a fishing lure according to this disclosure.

As shown, the concave portion 40 smoothly transitions to the bill portion 10 substantially near or within the head portion of the lure body. According to this configuration, the concave portion 40 and bill portion 10 operate in conjunction to provide the diving characteristics of the fishing lure. In addition to providing the diving ability of the lure, in part, the concave portion 40 contributes to the stabilization and/or action of the head portion of the lure, depending on the speed of the lure, while being retrieved or trolled.

It is to be understood that while the figures are drawn substantially to scale, other sizes and relative dimensions of the fishing lure disclosed herein are within the scope of this disclosure. In other words, the bill length and relative angle to the longitudinal axis of the lure body can vary depending on the dive characteristics desired. For example, but not limited to, a bill length from 0.5 inches to 3 inches and a bill angle from substantially 0 degrees to 60 degrees. Furthermore, it is to be understood that the area of the lure referred to as a concave portion and/or concave scoop portion includes variations which channel water from the top surface of the bill over the top of the lure body in a directed manner provided by the sides of the scoop/concave portion.

Referring to FIG. 2, illustrated is a right side plan view of the exemplary embodiment of a fishing lure according to this disclosure. As shown, the body 5 includes a belly region substantially near hook eyelet 20 which transitions to a relatively narrower tail region.

Referring to FIG. 3, illustrated is a front elevational view of the exemplary embodiment of the fishing lure according to this disclosure. As shown, and previously described, the concave portion 40 smoothly transitions to the bill 10.

Referring to FIG. 4, illustrated is a rear elevational view of an exemplary embodiment of the fishing lure according to this disclosure. As further shown, the lure body includes substantially flat sides and tapers in width from a relatively wider head and belly region to a relatively narrower tail region.

Referring to FIG. 5, illustrated is a top side plan view of an exemplary embodiment of the fishing lure according to this disclosure. As shown, the body 5 has substantially flat sides where the concave portion 40 smoothly transitions to the bill 10 portion.

Referring to FIG. 6, illustrated is a bottom side plan view of an exemplary embodiment of the fishing lure according to this disclosure.

Figure 7:
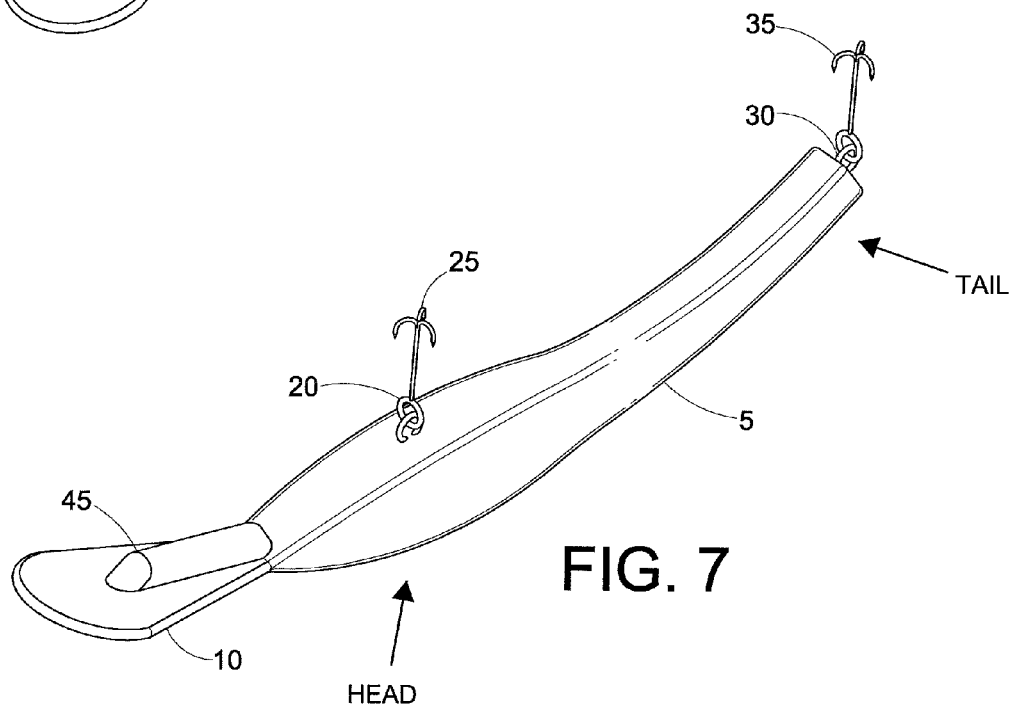
FIG. 7 is a bottom perspective view of an exemplary embodiment of a fishing lure according to this disclosure.

Referring to FIG. 7, illustrated is a bottom perspective view of an exemplary embodiment of the fishing lure according to this disclosure. As shown here, as well as other figures, the underside of the fishing lure has a substantially flat surface.

It is to be understood other variations of a fishing lure including a concave portion, as disclosed herein, are within the scope of this disclosure.

While the exemplary embodiment described herein is manufactured from molded plastic, other materials can be used, including wood, metal, lead and composite materials.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A fishing lure comprising:
an elongated lure body including a head portion, a tail portion, a topside, an underside and a first longitudinal axis defined from an end of the tail portion to an end of the head portion; and
a bill extending away from the head portion at a downward angle relative to the first longitudinal axis of the lure body and the bill substantially aligned along a second longitudinal axis offset from the first longitudinal axis at the downward angle, the bill including a top surface, a bottom surface, a front end and a rear end,
wherein the lure body includes an open-ended solid concave scoop portion providing a contoured external surface on the topside of the lure body substantially aligned with the bill along the second longitudinal axis associated with the bill alignment.

2. The fishing lure according to claim 1, wherein the lure body includes substantially flat sides.

3. The fishing lure according to claim 1, wherein the lure body includes the concave scoop portion on the topside which smoothly transitions to the bill.

4. The fishing lure according to claim 1, wherein the fishing lure includes one or more eyelets.

5. The fishing lure according to claim 1, wherein the topside and underside are curved and taper towards an end of the tail portion.

6. The fishing lure according to claim 1, wherein the concave scoop portion smoothly transitions from the rear end of the bill to a flat area of the topside of the elongated body.

7. The fishing lure according to claim 1, wherein the bill and concave scoop portion are adapted to provide a diving depth associated with the fishing lure.

8. The fishing lure according to claim 1, wherein the concave scoop portion, in part, configures the fishing lure to dive and stabilizes a side-to-side action of the fishing lure.

9. The fishing lure according to claim 1, wherein the elongated lure body tapers from a relatively wider width near the head portion to a relatively narrower width near the tail portion.

10. The fishing lure according to claim 1, further comprising:
a front eyelet for attaching a line and one or more hook eyelets for attaching one or more respective hooks.

11. The fishing lure according to claim 1, wherein a length of the lure body is greater in length than a length of the bill.

12. The fishing lure according to claim 1, wherein the downward angle is greater than 0 degrees and less than 90 degrees.

13. The fishing lure according to claim 1, wherein the fishing lure includes one or more of plastic, wood, composite material, metal, and lead.

14. The fishing lure according to claim 1, wherein a total length of the fishing lure is greater than 2 inches and less than 9 inches.

15. A fishing lure comprising:
an elongated lure body including a head portion, a tail portion, a topside, an underside portion including a belly portion, a first lateral side and a second lateral side, wherein a longitudinal axis is defined from an end of the tail portion to an end of the head portion; and
a bill extending away from the head portion at a downward angle relative to the first longitudinal axis of the lure body and the bill substantially aligned along a second longitudinal axis offset from the first longitudinal axis at the downward angle, the bill including a top surface, a bottom surface, a front end, and a rear end,
wherein the lure body includes an open-ended solid concave scoop portion providing a contoured external surface on the topside of the lure body substantially aligned with the bill along the second longitudinal axis wherein the concave portion smoothly transitions to the bill, and the topside and underside are curved and taper towards an end of the tail portion.

* * * * *